United States Patent Office 3,161,610
Patented Dec. 15, 1964

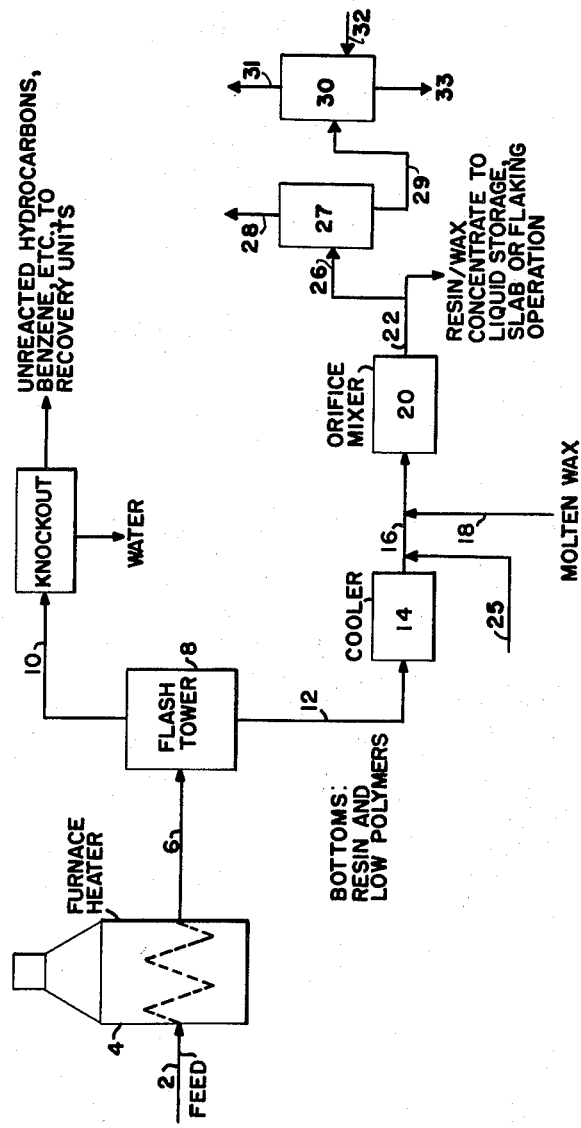

3,161,610
PETROLEUM RESIN/WAX COMPOSITIONS
George A. Weisgerber, Cranford, and Herman L. Thwaites, Clark, N.J., assignors to Esso Research and Engineering Company, a corporation of Delaware
Filed Oct. 2, 1961, Ser. No. 142,087
6 Claims. (Cl. 260—28.5)

The present invention relates to petroleum wax products. More particularly, the present invention relates to novel blends comprising petroleum wax and petroleum resins which are especially suited for coating and impregnating paperboard and particularly corrugated cartons and sheets. The present invention in its preferred embodiment relates to a superior and novel process for preparing blends of wax and petroleum resins.

Paraffin waxes and wax compositions containing a host of additives have been employed for a variety of uses, such as waterproofing textiles and papers, preparing insulating coatings, coatings for milk cartons and the like. It is common experience that each particular end use dictates the desirable characteristics of the coating, and thus additives and compositions eminently suitable for one purpose are not suitable for another. Thus a large variety of wax compositions have been described that are especially suitable for some specific uses but not for others.

A new use for wax that has recently been developed is the impregnation of corrugated paperboard containers. Particularly when these containers are used in connection with storing and transporting of foods, it has been found that a gradual reduction in strength occurs, even after impregnation with wax compositions that in other applications normally afford good waterproofing protection. This loss of strength is due to the severe conditions of long and continued exposure to moisture or water. Thus, these cartons are often used in shipping either icepacked or "hydrocooled" foods. The term "hydrocooled" refers to chilling both the carton and contents in 30° F. brine. Under these severe conditions, corrugated cartons impregnated with wax and many wax compositions normally imparting strength to fibrous materials failed to afford sufficient protection.

It has hitherto been found that corrugated cardboard containers could be greatly strengthened by impregnation with blends of certain petroleum waxes and certain resins prepared by polymerizing olefin-comprising hydrocarbons. These resins are hard, hydrocarbon-soluble materials having a melting point of 158° F. and higher, and result from the polymerization of olefinic and diolefinic constituents of selected petroleum streams. These resins are described in the patent to Ward, Canadian No. 531,202, dated October 2, 1956, and also the patent to Hollinger et al., U.S. 2,967,116, issued January 3, 1961.

Thus, hydrocarbon resins to which the present invention is applicable are made by treating a hydrocarbon mixture containing diolefins, olefins, aromatics, paraffins, and naphthenes with 0.25 to 1.75% of an aluminum halide catalyst such as aluminum chloride and aluminum bromide. The catalysts may be used as solids or they may be employed as slurried in inert diluents or as hydrocarbon complexes such as are prepared by reacting aluminum chloride with raffinates stripped from resin polymerizates, for example, a naphtha containing about 60% olefins and 40% aromatics.

The polymerization feed should preferably be one from which the cyclodienes have been substantially removed. Typical hydrocarbon fractions useful for feeds in making these resins boil from 20° to 170° C. Analyses show the following compositions:

| | Fraction, ° C. | Wt. Percent |
|---|---|---|
| Distillation | 20–70 | 0–60 |
| | 70–130 | 65–40 |
| | 130–170 | 35–0 |

| | Wt. Percent |
|---|---|
| Diolefins | 8–20 |
| Aromatics | 19–49 |
| Olefins | 60–30 |
| Paraffins and naphthenes | 5–1 |

The polymerization reactions are conducted at temperatures in the range −30° to +75° C. (preferably −10° to +60° C.). Residual catalyst is quenched by suitable methods, such as addition of methyl alcohol and subsequent filtration, or by addition of dilute acid, water and/or caustic washing. The final solution is then stripped of unreacted hydrocarbons and low molecular weight oils by vacuum or steam distillation. The product is a substantially non-aromatic unsaturated hydrocarbon resin. A hydrocarbon mixture suitable for resin production is conveniently found in hydrocarbon streams obtained by steam cracking gas oils, heavy naphthas, or residua from petroleum. These cracked streams have side boiling ranges between 20° and 170° C., or may be composed of any intermediate fraction selected from this range. The petroleum distillate resins synthesized by this method usually have softening points about 70° C.

The resin prepared in accordance with this process has a softening point of about 158° to 218° F., a molecular weight in the range of 800 to 2,000, and an Iodine Number (Wijs) of 100 to 140, preferably below 120. About 1 to 20% by weight of the resin is incorporated into the final wax composition.

When polymerization is completed, in current commercial practice, the crude resin is subjected to flash operation to strip off volatile components and is then diluted with hydrocarbons boiling in the range of about 230° to 460° F. and passed to storage or shipment to the blending plant. There the solution of resin in hydrocarbon is vacuum stripped at 5 to 50 mm. at elevated temperatures and the resin is recovered. The higher the stripping temperature, the higher the softening point of the resin. Thus the latter may be raised from about 150° F. to about 215° F. Also, the softening point is dependent upon the amount of diluent left in resin.

An important problem that has arisen is that when the resin, prepared in the manner outlined, is dissolved in the wax to make the wax-resin blend, there is observed a marked color degradation. This color degradation occurs during the heating step in which the resin is dissolved in the wax. This solution step is carried out at a temperature of from 200° to 250° F., and it is necessary to maintain this temperature for a period of time sufficient to dissolve the wax. Apparently under these conditions, the resin is oxidized to a slight extent, and this may account for the poorer color. A poor color is a particular problem when the paperboard to be impregnated is light colored.

It is the principal object of the present invention to set forth an improved process for preparing blends of wax and petroleum resins which is simpler, cheaper and produces a more stable product than hitherto found feasible.

It is a further object of the present invention to prepare a blend of wax and petroleum resin which is softer, more flexible and has improved properties over blends prepared by existing processes.

Other and further objects and advantages of the present invention will become more apparent hereinafter.

As pointed out above, it is current practice to react a C$_5$–C$_9$ olefin-diolefin stream with AlCl$_3$, hydrolyze unreacted catalyst, and wash and purify the product to remove catalyst and organic chlorides from the polymerizate. Thereafter the mixture is heated in a furnace to volatilize unreacted hydrocarbons and traces of water, while the resin remains in a liquid state. The fractions are separated in a flash tower, the bottoms product remaining being the resin and some polymer oil of lower molecular weight. In the normal operation, this bottoms product is cut back with LPD (low pressure distillate), cooled and put into tankage for liquid shipment at ambient temperatures. Normally, the low pressure distillate, which is a naphtha fraction boiling in the range of about 230° to 460° F., is later stripped out at the resin plant to yield the petroleum resin.

Stripping is carried out under vacuum and short residence time at elevated temperatures and reduced pressures. The softening point of the final product is determined by the extent and severity of the stripping step, that is, the softening point depends on how much of the added LPD is allowed to remain in the resin.

In one embodiment of the present invention, molten wax instead of LPD is injected into the line from the flash tower and the wax serves as the resin carrier. This puts the resin into wax solution directly rather than requiring a stripping step and a consequent high temperature solution step in later wax blend preparations; there is obtained a product directly usable for wax blending, far more readily and conveniently handled and moved in the refinery in liquid form than the solid resin presently employed. Furthermore, the process of the present invention avoids the addition of LPD, a subsequent reheating and stripping step, and a still further high temperature solution step, all of which combine to degrade the resin.

The process of the present invention is more readily understood when read in conjunction with the accompanying drawing which is a schematic representation of one preferred embodiment.

Turning now to the drawing, hydrolyzed and washed polymerized product from the polymerization section containing resin, low polymers, unreacted hydrocarbons and traces of water is passed via line 2 to furnace heater 4. The latter is at a temperature of about 500° F. and 15 p.s.i. The heated product is then passed to flash tower 8 via line 6. Overhead is removed the volatilized product, such as unreacted hydrocarbons, benzene, water and the like. These are withdrawn through line 10 for passage to the recovery system.

The bottoms product, consisting of molten resin and lower polymers, is withdrawn through line 12 and cooled in cooler 14 to about 260° to 300° F. and passed via line 16 to orifice mixer 20. Molten wax, which may be slack wax, scale wax, refined wax, or microcrystalline wax, or mixtures of these, is injected into line 16 via line 18. The molten wax is at a temperature of about 160° to 200° F. and it may be added to the resin stream in proportions of 0.05 to 20 parts wax per part of resin, preferably 1 part wax per part resin.

The resin-wax concentrate is withdrawn through line 22 and may be passed to liquid storage at elevated temperatures, or it may be converted directly to solid form by slabbing or flaking, all in a manner known per se. The wax-resin concentrate is now in form directly usable for direct application or for wax blending to prepare the compositions for impregnating corrugated paperboard, or for other wax blend uses.

The process of the present invention may be subjected to several modifications. Thus, under some circumstances, it may be desirable to include some low pressure distillate along with the molten wax added through line 18. In this modification, 0.5 to 10 parts of LPD per part of wax may be added. The LPD is thereafter stripped from the wax-resin product in a stripping zone under a stream of inert gas, preferably nitrogen, at atmospheric pressure, and a temperature of 400° to 450° F. Thus more efficient removal of the solvent is realized. The low pressure distillate is introduced by means of line 25. If this is done, it is preferred to introduce the stream after the orifice mixer into zone 27 by means of line 26. The bulk of the low pressure distillate is removed overhead from zone 27 by means of line 28. The resin with a minor amount of the distillate is removed by means of line 29 and introduced into zone 30. Here the remaining amount of low pressure distillate is removed overhead by means of line 31. An inert stripping gas is introduced by means of line 32. The resin wax concentrate is removed by means of line 33. As the data below show, resins stripped in the presence of wax are more stable against thermal degradation, have better colorhold and better wax solubility, than resins made by stripping the LPD from the resin directly.

In still a further embodiment of the present invention, the wax-resin-LPD may be subjected to further reaction. Low Pressure Distillate has the inspections shown below and thus contains hydrocarbons which may be polymerized to form resins.

LOW PRESSURE DISTILLATE

| | |
|---|---|
| Density @ 77° F. | 0.8771 |
| Bromine No. L & B | 49.9 |
| Electrometric Bromine No. | 56.9 |
| Distillation (atmospheric pressure): | |
| I.B.P. | 236 |
| 5 | 256 |
| 10 | 264 |
| 20 | 274 |
| 30 | 288 |
| 40 | 300 |
| 50 | 318 |
| 60 | 340 |
| 70 | 362 |
| 80 | 386 |
| 90 | 416 |
| 95 | 436 |
| Final | 455 |
| Percent rec. | 99 |

In accordance with this modification of the present invention, the wax-resin-LPD mixture may be reacted with another monomer, such as styrene, divinylbenzene or other polymerizable hydrocarbon or substituted hydrocarbon in the presence of a polymerization catalyst. By including the wax, the latter not only is present at the end of the reaction as the blending agent, but also the wax may actually take part in the cross linking reactions.

The amount of wax incorporated in the resin is about 5 to 50%, or even 95%, based on the total wax/resin product. The larger amount of wax is used when ultimate storage and handling conditions are at relatively low temperatures of about 200° F., readily obtainable with low pressure steam. The viscosity of the resin-wax product at about 50% wax is about 20 cs. at 210° F. in the case where the wax component is a paraffin of about 3.3 cs. viscosity at 210° F., which is comparable to the viscosity of microwax.

When higher storage and handling temperatures are available or if the wax-resin product is to be flaked or pelletized, then smaller amounts of wax may be used. These wax-resin products may be readily dissolved at low temperatures into additional quantities of wax to prepare compositions of the desired wax-resin ratios for the end use application such as for impregnating corrugated paperboard cartons.

The advantages in resin stability obtainable by operating in accordance with the present invention are illustrated in the specific examples below.

In a series of laboratory tests, a sample of resin concentrate, i.e. 55% resin in low pressure distillate, was stripped by atmospheric distillation up to 450° F. and then finished by nitrogen stripping at 400° to 450° F. Two stripping experiments were conducted, as follows:

(1) Resin concentrate with LPD plus two parts of scale wax (M.P. 125/127) part per resin.
(2) Resin concentrate with LPD plus two parts microcrystalline wax (congealing point by ASTM D-938-49, 165° F.) per part resin.

In Table I there are shown inspections of the combined wax plus resin stripped product as prepared above compared with blends of the same waxes with the commercial type of the same resin, the latter being added as a solid and dissolved in the wax at a temperature of 220° to 250° F. for the scale blend; 250° to 275° F. for the microwax blend. It is of interest to note that the stripped wax-resin combination has certain different physical, chemical and performance properties from the wax-resin blend made by dissolving the solid resin. The former is lower melting, softer, more flexible and higher in sealing and laminating strengths. In particular, the blends prepared by stripping resin concentrate in the presence of the wax are of interest in that the data indicate that some interaction of the wax and resin appears to take place during the stripping operation.

test), and better sealing strength than the simple microcrystalline wax/resin blend.

Thus, these added performance advantages for the wax/resin combinations show that the compositions can be used in certain laminating or paper coating applications, besides being useful in the corrugated carton impregnation.

What is claimed is:

1. An improved process for preparing a wax-petroleum resin composition which comprises subjecting to a Friedel-Crafts polymerization reaction a hydrocarbon fraction boiling from about 20° C. to about 170° C. and containing diolefins, olefins and aromatics at temperatures in the range of from about −10° to about 60° C. to secure a polymerization product containing molten resin, subjecting said polymerization product to a hydrolytic reaction to secure a hydrolyzed product, heating the hydrolyzed product to remove unreacted hydrocarbons from the molten resin, cooling the molten resin to a temperature in the range from about 260° to 300° F., and immediately mixing said molten resin with molten petroleum wax.

2. The process of claim 1 wherein said hydrocarbon fraction is derived from a steam cracking operation.

*Table I*

PETROLEUM RESIN BLENDS

|  | ASTM | 100% WCS | Wax/Resin Concentrate, 65% WCS*+35% Resin | | 100% Microwax | Microwax/Resin Concen., 65% Microwax+35% Resin | |
| --- | --- | --- | --- | --- | --- | --- | --- |
|  |  |  | Using Resin Stripped In Wax | Using Same Resin Blended Into Wax |  | Using Resin Stripped In Wax | Using Same Resin Blended Into Wax |
| Congealing Pt., ° F | D-938 | 124 | 119 | 128 | 165 | 158 | 163.5. |
| Vis. @ 210° F., cs | D-445 | 3.3 | 11.5 | 13 | 20.6 | 74.3 | 85.5. |
| Penetration, mm. at— |  |  |  |  |  |  |  |
| 77° F | D-1321 | 16 | 33 | 17 | 27 | 19 | 16. |
| 100° F |  | 175 | 300+ | 285+ | 77 | 139 | 93. |
| Bromine No | D-1159 | Nil | 19.5 | 17.2 | 0 | (¹) | 17.8. |
| Comp. Flexibility at 73° F. (No. of Bends) |  | 0 | 3 | 0 | 1-5 | 23 | 16. |
| Laminating Strength, g./in | | Nil | 86 | 40 | 37 | 500+, split | 500+, split. |
| Hot Melt Appearance |  | Clear | Clear, yellow | Cloudy, red brown. | Clear | Clear, light amber. | Cloudy, chocolate. |
| 50/50 Blends+3% Polyethylene (MW 12,000): |  |  |  |  |  |  |  |
| Tensile Strength, p.s.i |  |  | 100 | 150 |  | 250 | 275. |
| Blocking Pt., ° F |  |  | 109/124 | 121/124 |  | 93/94, weld | 125/128. |
| Stain Temp., ° F |  |  | 116 | 118 |  | 125 | 125. |
| Sealing Strength, gm./in |  |  | 35 | 22 |  | 63 | 39. |

*White crude scale wax.
¹ Not soluble in test reagents.

Comparative flexibility is measured on a wax sample cast into a bar measuring ⅛" x ½" x 4". The bar is conditioned at 73° F., 50% R.H., and is laid flat on a smooth surface, then bent by hand over the edge of that surface to a downward deflection of 90°; the bar is immediately deflected to an upward deflection, the 180° total deflecion being recorded as one bend. The operation is immediately repeated, and the number of bends that the sample withstands before fracture is reported. A high number of bends is achieved when the wax is flexible and tough.

It is of importance that the wax/resin combinations made by the present invention are compositions which show better laminating strength than obtainable from the scale wax alone or the blend of resin and scale. Thus, it is of special value that the scale wax/resin combination can be considered as constituting a "synthetic microcrystalline wax" for use in some laminating applications, although the material actually contains no microcrystalline wax of the usual type. Similarly, the wax/resin composition of the present invention has sealing strength better than obtained with the simple blend of wax and resin. The microcrystalline wax/resin combination shows good laminating strength (i.e. the maximum value in this 3. The process of claim 1 wherein said hydrocarbon fraction contains 8 to 20% diolefins, 19 to 49% aromatics, 60 to 30% monoolefins, and 5 to 1% paraffins and naphthenes.

4. The process of claim 1 wherein 0.05 to 20 parts of molten wax are added per part resin.

5. The process of claim 1 wherein 0.5 to 10 parts of low pressure distillate per part of wax is added along with said molten wax.

6. A novel composition of matter comprising a wax-resin concentrate of high laminating strength prepared by the process of claim 1.

References Cited in the file of this patent

UNITED STATES PATENTS

| 2,015,739 | Winning | Oct. 1, 1935 |
| 2,097,468 | Rabe et al. | Nov. 2, 1937 |
| 2,443,221 | Bergstein | June 15, 1948 |
| 2,514,979 | Turner et al. | July 11, 1950 |
| 2,535,604 | Schiermeier et al. | Dec. 26, 1950 |
| 2,967,116 | Hollinger et al. | Jan. 3, 1961 |

FOREIGN PATENTS

| 637,586 | Great Britain | May 24, 1950 |